United States Patent [19]
Brossard

[11] Patent Number: 5,488,828
[45] Date of Patent: Feb. 6, 1996

[54] ENERGY GENERATING APPARATUS

[76] Inventor: Pierre Brossard, 49 Buck Run Rd., Frenchville, Pa. 16836

[21] Appl. No.: 61,679

[22] Filed: May 14, 1993

[51] Int. Cl.⁶ .................................................... F03G 7/04
[52] U.S. Cl. ............................................. 60/675; 60/641.6
[58] Field of Search .................................. 60/675, 641.6, 60/656, 641.1

[56] References Cited

U.S. PATENT DOCUMENTS

| | | | |
|---|---|---|---|
| 3,953,971 | 5/1976 | Parker | 60/675 |
| 4,187,686 | 2/1980 | Pommier | 60/641.6 |
| 4,318,275 | 3/1982 | Brown et al. | 60/675 |
| 4,507,916 | 4/1985 | Anderson | 60/641.1 |
| 4,760,706 | 8/1988 | Nasser | 60/675 |

FOREIGN PATENT DOCUMENTS

8103360 11/1981 WIPO .

*Primary Examiner*—Ira S. Lazarus
*Assistant Examiner*—L. Heyman
*Attorney, Agent, or Firm*—Quarles & Brady

[57] ABSTRACT

An apparatus and method for obtaining energy is disclosed. The method includes heating a fluid in a liquid state by heat exchange with a heat source to generate a vapor of the fluid at a first elevation. The vapor of the fluid is caused to rise to a second elevation within an enclosed space and is condensed at the second elevation by heat exchange with a cold source. The liquid obtained by condensing the vapor is caused to fall from the second elevation and the energy of the falling liquid is converted to another form of energy, which is preferably electricity. The apparatus of the invention includes structure for vaporizing a liquid to form a vapor, a vapor tower for increasing the potential energy of the vapor by causing the vapor to rise along an upwardly-extending path. Structure is also provided for condensing the vapor by heat exchange with a cold source and recovering the increase in potential energy from the vapor, preferably in the form of electric power.

30 Claims, 6 Drawing Sheets

ENERGY GENERATING APPARATUS

BACKGROUND OF THE INVENTION

The purpose of this invention is to take advantage of physical properties of vaporization and condensation to provide a useable source of energy. A naturally-occurring or man-made temperature differential is used as an energy source to operate the device.

SUMMARY OF THE INVENTION

According to the present invention, a boiler having a heating source is provided for heating a volume of liquid contained in the boiler, thereby generating vapor. The vapor is caused to pass out of the boiler and into an upwardly extending gas-tight vapor tower, connected at its upper end to a condenser. As the vapor is forced upward, its potential energy increases. When the vapor reaches the condenser, it is condensed into liquid by means of a cold source, and is collected in a primary reservoir mounted at the top of a liquid tower. At the base of the liquid tower is a turbine driving a generator for generating electricity. The condensed liquid passes downwardly through the liquid tower, through the turbine, and is collected in a collector reservoir. The movement of the liquid through the turbine causes the generator to spin, and thereby provides a source of electricity.

Servo-valves connected between the condenser and the reservoir, and the collector tank and the boiler, help regulate the flow of liquid in the device. Regulating the flow of liquid maintains proper pressure differentials, which enable the device to continue to operate. In addition, a vacuum pump connected to the primary reservoir through a third servo-valve controls the pressure in the primary reservoir to help regulate liquid flow into said primary reservoir during initiation of the device.

Electricity generated by the generator is used to operate one or more electric fans and a compressor for transferring energy from a heat source to the boiler, and for transferring heat out of the condenser to a cold source. The generator is also used to power the vacuum pump, the servo-valves and a regulator system.

The heat source and the cold source for supplying energy to the device can be the atmosphere surrounding the device, a subterranean well or the sea. These external heat/cold sources are utilized to generate vapor in the boiler, force the vapor to rise from the boiler to the condenser at the top of the vapor tower, and to condense the vapor into liquid form. If the vapor tower and liquid tower are properly dimensioned, the increase in potential energy imparted to the vapor as it rises up through the vapor tower will be sufficient to sustain the operation of the device, and simultaneously provide a source of electric power which can be used for other purposes.

In its simplest form, the device may be thought of as a hydroelectric power plant in which an energy source other than the electricity generated by the power plant is used to pump water from a lower portion of the device to an upper portion of the device. A portion of the electricity generated by the power plant is used internally in the device to facilitate the exploitation of an external power source, i.e. the temperature differential between the hot and cold source. The total electric power required to exploit the external power source is less than the total amount of electricity generated by the power plant. Thus, the device is capable of providing a useable source of energy.

BRIEF DESCRIPTION OF THE DRAWINGS

The attached drawings depict presently preferred embodiments of the invention. The drawings, however, should not be viewed as limiting the invention to the precise arrangements and instrumentalities shown, wherein.

DETAILED DESCRIPTION OF THE INVENTION

Figure 1:
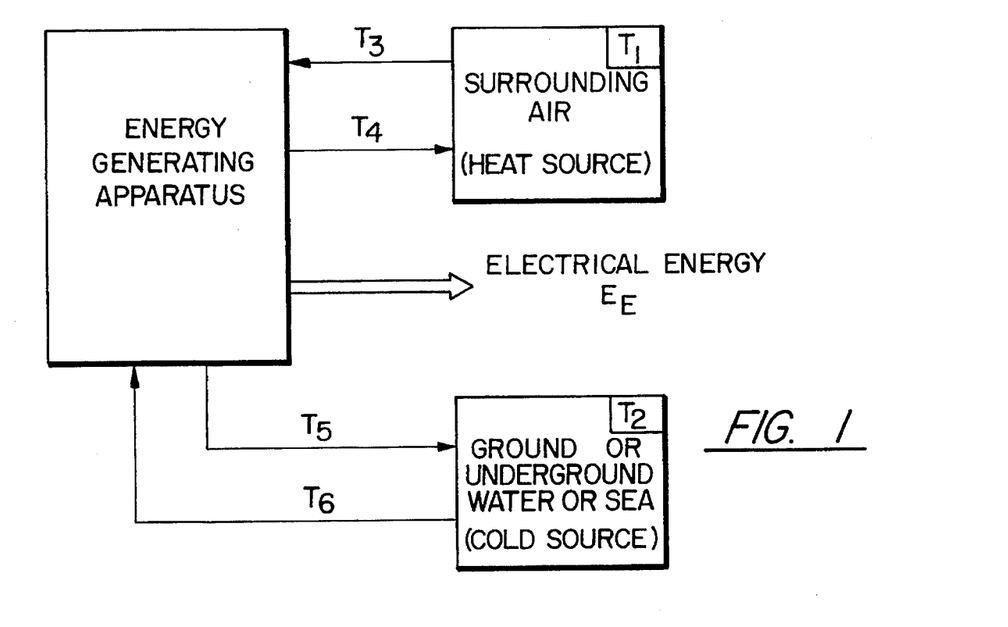
FIG. 1 is a thermodynamic diagram showing the theory of operation of a first embodiment of the invention, wherein the surrounding air is warmer than the sea or subterranean water supply.
Figure 2:
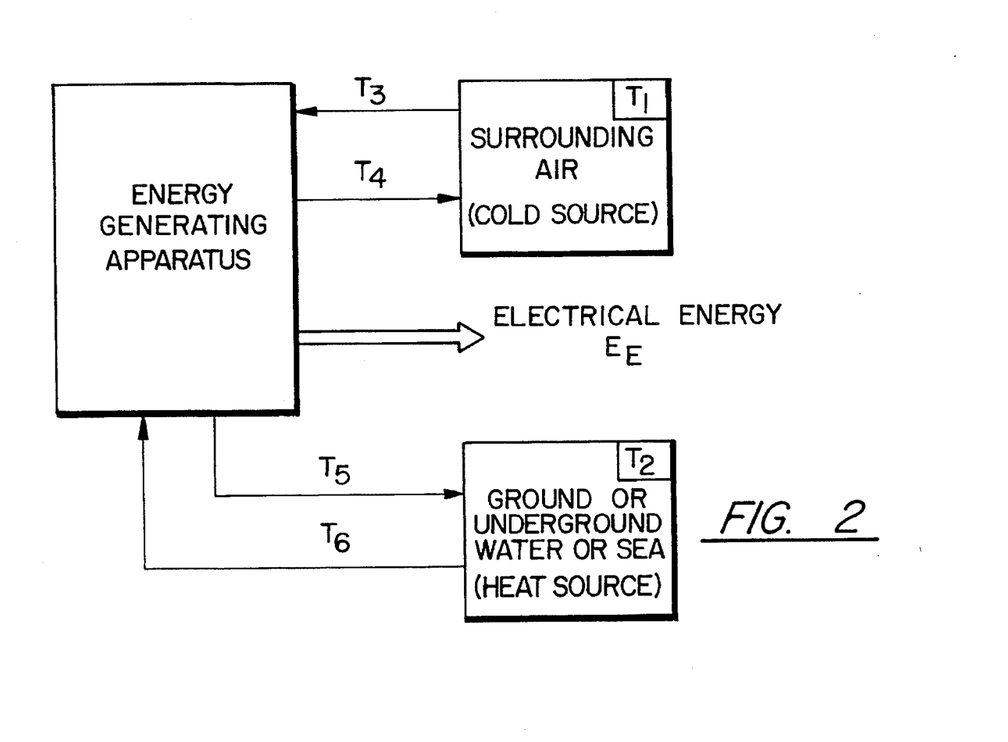
FIG. 2 is a thermodynamic diagram showing the theory of operation of a second embodiment of the invention, wherein the air surrounding the device is colder than the sea or subterranean water supply.

A thermodynamic diagram representing the operation of the device of the present invention is shown in FIGS. 1 and 2. In FIGS. 1 and 2, $T_1$ is the temperature of the air surrounding the device, $T_2$ is the temperature of the sea or subterranean water supply, $T_3$ is the temperature of the air drawn into the device, $T_4$ is the temperature of the air after it has been passed through the device, $T_5$ is the temperature of the subterranean water or sea water after it has been used by the device and $T_6$ is the temperature of subterranean water or sea water when it enters the device.

FIG. 1 represents the operation of a first embodiment of the device for conditions where the air surrounding the apparatus ($T_1$) is warmer than the sea or subterranean water supply ($T_2$). In FIG. 1, $T_3$ is greater than $T_4$ because heat energy is removed from the surrounding air as it passes through the device. In contrast, the temperature $T_6$ of subterranean water or sea water entering the device is increased by absorbing heat as it passes through the device. Thus, $T_5$ is greater than $T_6$. In FIG. 1, the temperature differential between $T_1$ (the air surrounding the device) and $T_2$ (the subterranean water supply or sea) is used as a source for electric energy $E_E$.

FIG. 2 is similar to FIG. 1, except that in FIG. 2, the air surrounding the apparatus is colder than the subterranean water supply or sea water. In FIG. 2, $T_3$ is less than $T_4$, and $T_5$ is less than $T_6$. The water serves as a heat source and the atmosphere as a cold source. Thus, FIG. 2 also shows that the device of the present invention uses a temperature differential between the atmospheric air surrounding the device and ground water or sea water in order to generate electricity. FIGS. 1 and 2 demonstrate that, depending upon the environmental conditions, the atmosphere surrounding the device or a subterranean water supply (or the sea) can each serve as a hot or cold source.

Figure 3:
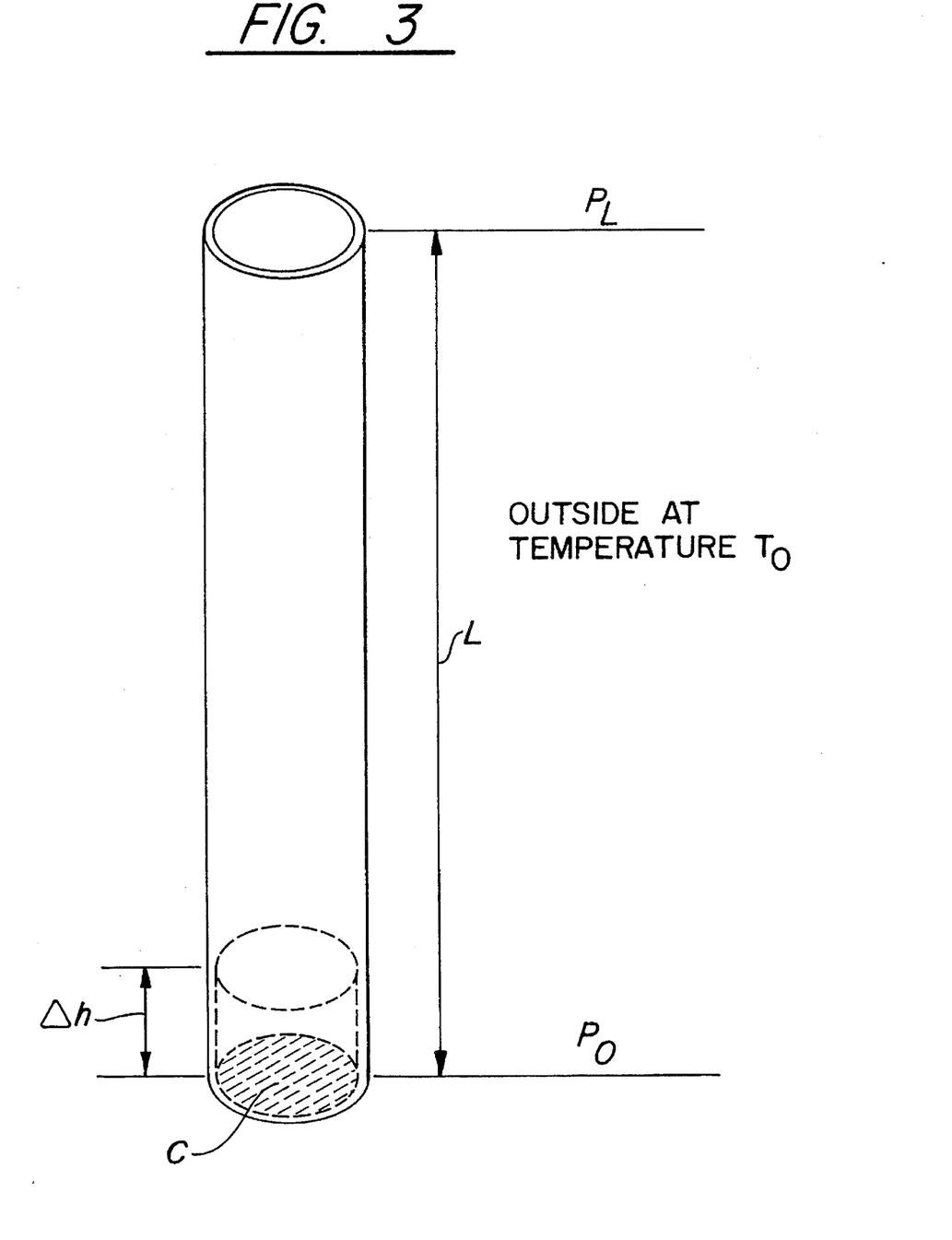
FIG. 3 is a diagram showing the theory of operation of the invention for generating useable energy.

For the purpose of understanding the present invention, it is helpful to first consider a simplified example which demonstrates the theory of operation of the device. FIG. 3 is provided for this purpose.

In FIG. 3, a pipe of length L and of cross-section C is positioned vertically. Initially, the temperature of the air inside and outside of the pipe (cold source) is $T_0$ and has a mass per unit volume of $\rho_0$. M is the mass of a volume of air $V_0$ inside of the pipe defined by cross-section C and length $\Delta h$. For the purpose of this example, it will be assumed that the air in the pipe is adiabatic, i.e. there is no transfer of heat from the air inside the pipe to the air outside the pipe.

In FIG. 3, the temperature of the mass of air M can be increased from $T_0$ to $T_1$ by adding a quantity of heat Q (heat source). Q can be mathematically represented as $$C_v M \text{ or } C_v V_0 \rho_0$$

where $C_v$ is the specific heat of the air. The total energy of this mass of air N when it is at the bottom of the pipe, before heating, is then $$E_{t0} = E_{P0} + E_{c0} \tag{1}$$

wherein $E_{P0}$ is the potential energy at altitude zero and $E_{c0}$ is the total kinetic energy at altitude zero before heating. After heating, the total energy of this same mass of air may be described as $$E'_{t0} = E_{p0} + Q. \tag{2}$$

After heating, $\Delta h$ increases to accommodate the increase in the volume of the air. Thus the mass of air M will have a mass-per-unit volume less than the air above and below it. Consequently, this air will rise in the pipe. During this displacement, the total energy $E_{th}$ at altitude h of this mass of air will now become:

$$E_{th} = E'_{t0} + \Sigma_W \tag{3}$$

where $\Sigma_W$ is the sum of the external forces acting on the mass of air. By performing a complete mathematical integration of $\Delta h$ over the length of the pipe L, it can be shown that $$\Sigma_W = (P_0 - P_h)Ch - Mgh \tag{4}$$

where $P_0$ is the atmospheric pressure at altitude zero, $P_h$ is the atmospheric pressure at altitude h, and g is the acceleration of gravity. For a vertical displacement of length L, and considering all the air in the pipe at $T_1$, the summation of external forces is $$\Sigma_{WL} = (P_0 - P_L)CL - MgL \tag{5}$$
$$= L[(P_0 - P_L)C - Mg]$$

since $P_0 - P_L = \rho_0 gL$, and $Mg = \rho_1 CLg$ then it can be shown that $$\Sigma_{WL} = L^2 Cg(\rho_0 - \rho_1) \tag{6}$$

where $\rho_1$ is the mass per unit volume of the air after heating. From the foregoing, and by combining equations 3 and 6, it can be seen that the total energy of the mass of air at altitude L will be $$E_{tL} = E'_{t0} + L^2 Cg(\rho_0 - \rho_1) \tag{7}$$
$$= E_{p0} + E_{c0} + Q + L^2 Cg(\rho_0 - \rho_1). \tag{8}$$

In equation (7), since $\rho_0$ is greater than $\rho_1$, then $L^2 Cg(\rho_0 - \rho_1)$ will be positive. Based upon equation (8), it can be seen that adding a quantity of energy Q to the mass of air at the bottom of the pipe results in an increase in the total energy of the air when it arrives at the top of the pipe which is:

$$Q + L^2 Cg(\rho_0 - \rho_1).$$

It should be noted that after exiting the pipe, the warm air at temperature $T_1$ will distribute its heat Q to the cold air outside the pipe. As a result, the increase in energy associated with the air will be $L^2 Cg(\rho_0 - \rho_1)$. Thus, the transfer of heat energy from the hot source to the cold source through the pipe results in an increase in potential energy for the air passing through the pipe, said increase being $L^2 Cg(\rho_0 - \rho_1)$.

In the above equation, it should be noted that $\rho_0 - \rho_1$ is a constant defined by the difference of temperature between the cold source and the hot source. Likewise, g is also a constant. Thus, under the conditions specified, by adjusting L and C (the dimensions of the pipe), the increase of total energy of the air as it rises from the bottom of the pipe to the top of the pipe can be adjusted to any value per unit of mass. Since $\rho_0 - \rho_1$ is a positive number, it can also be seen that $L^2 Cg(\rho_0 - \rho_1)$, is a positive number. Thus the increase in potential energy is positive.

In the foregoing example, in order to simplify the mathematics, it was assumed that $\rho$, the mass per unit volume, was a constant with altitude. This assumption is reasonable because, as discussed below, the height of the device is unlikely to exceed 300 meters. However, even if the variation of $\rho$ with altitude were taken into account, the more precise mathematical calculation would show that the increase in total energy is a function only of the dimension of the pipe.

In the example, certain significant assumptions were made to simplify the mathematical calculations. These include:

1. that a hot and cold source are available;
2. that the displacement of air in the pipe is adiabatic, i.e. there is no transfer of heat from the air inside the pipe to the air outside the pipe; and
3. that there is no external work done by the air in the pipe.

The various embodiments of the present invention, which will be described in detail below, are based upon the principal demonstrated above with respect to FIG. 3, and achieves the above three (3) conditions. In FIG. 3, it was demonstrated that the potential energy of a volume of gas in a pipe could be increased by applying a quantity of heat and then allowing the gas to rise in the pipe. The present invention is designed such that the increase in potential energy, acquired by a gas as it rises in a tower, is transformed into a usable energy source which may be tapped for other uses. This result is achieved by transforming the gas to a liquid state for converting its increased potential energy to a different form of energy.

Figure 4:
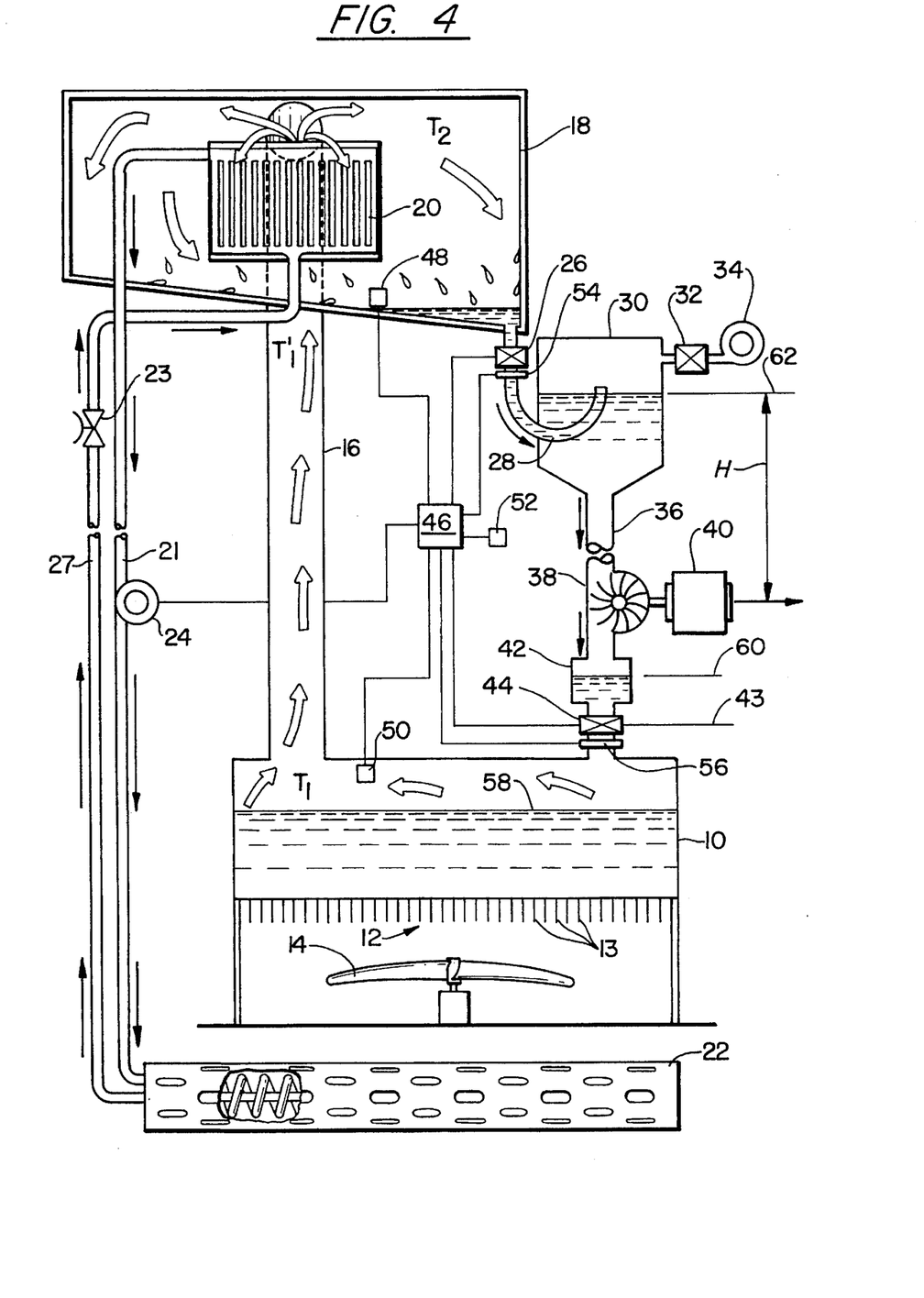
FIG. 4 shows a schematic diagram of a first embodiment of the present invention which is designed for conditions wherein the sea or subterranean water supply is colder than the air surrounding the device.

A first embodiment of the device according the present invention is shown in FIG. 4. The device includes a boiler 10 and a heat exchanger 12. Heat exchanger 12 transfers heat from the surrounding atmosphere into boiler 10 for boiling a liquid contained therein and thereby creating vapor. Associated with the heat exchanger 12 is a fan 14 for the purpose of improving the transfer of heat from the air surrounding the device to the heat exchanger 12. The air, under these circumstances, functions as a heat source.

In FIG. 4, heat exchanger 12 is shown as a series of heat conductive fins 13 attached to the bottom of boiler 10. The heat conductive fins provide additional surface area for heat transfer from the air surrounding the device into boiler 10. If this type of heat exchanger is used, fan 14 is arranged to force air over the surface of the heat conducting fins 13 to further facilitate the transfer of heat from the air to the boiler. FIG. 4 shows one possible arrangement for transferring heat from the outside air to the boiler 10. However, it should be noted that numerous alternative embodiments are also possible to achieve this same result. For example, instead of a single large fan 14 blowing air directly upon the bottom of boiler 10, a series of fans can be positioned to blow air down the length of fins 13 across the bottom of the boiler 10. Alternatively, heat exchanger 12 may comprise a series of heat conductive pipes passing through the interior of boiler 10 and carrying air forced through them by a fan. In general, any suitable mechanism for transferring heat from the outside air into boiler 10 will be sufficient for the device to function.

Attached to the upper portion of the boiler is an upwardly-extending gas-tight vapor tower 16. Vapor tower 16 has, at its upper end, a condenser 18. Evaporator 20 is located within condenser 18 and functions as a cooling mechanism for condensing liquid in condenser 18.

Evaporator 20 and heat exchanger 22 operate in cooperation with compressor 24, ducts 21, 27 and expansion valve 23 to function as a heat pump. Heat associated with the vapor generated in boiler 10, is collected in condenser 18 and absorbed by evaporator 20. The heat is then transferred to the underground cold water source, or to the sea, by means of compressor 24 and heat exchanger 22 in a manner which is well known in the heat pump art. Refrigeration gas, such as R-12 or freon, is contained within ducts 21, 27. When exiting from evaporator 20, the refrigerant is at low pressure, in gaseous form, and is relatively cool. The gas is then raised to a higher pressure and higher temperature as a result of the operation of compressor 24. The compressed gas continues through duct 21 and into heat exchanger 22. The high-pressure, high-temperature gas is cooled as it passes through heat exchanger 22 and exits through duct 27, still in its gaseous state. The gas continues through duct 27 until it exits at expansion valve 23 where, as a result of the decompression, it becomes a liquid at a cool temperature. The liquid refrigerant is then passed through evaporator 20 where it absorbs heat and returns to its low pressure gas form to complete the cycle. As noted above, heat pumps which operate in this manner are well known in the art, and serve as but one example for the manner in which heat may be transferred from evaporator 20 to heat exchanger 22. Any suitable apparatus capable of efficiently transferring heat can be used for this purpose.

Condenser 18 is provided with a servo-valve 26 capable of controlling the flow of condensed liquid out of condenser 18. Associated with condenser 18 is a vapor trap 28. Vapor trap 28 is preferably a U-shaped tube attached at one end to servo-valve 26. However, any suitable means for passing condensed liquid out of condenser 22, while preventing vapor from escaping, can also be used for this purpose. Such means include a float drain or a thermostatic drain type device.

At the end of vapor trap 28 opposite from servo-valve 26, the vapor trap sealingly passes through the walls of a gas-tight primary reservoir 30 and extends upwardly from a lower portion thereof. As noted above, the vapor trap provides a passageway for liquid to move from the condenser 18 to primary reservoir 30 while preventing steam from exiting condenser 18. Near the top of primary reservoir 30 is an opening controlled by servo-valve 32. When servo-valve 32 is opened, it forms a gas-tight passage between an upper portion of primary reservoir 30 and vacuum pump 34. Servo-valve 32 can be opened or closed, as necessary, to vary the pressure in primary reservoir 30. However, as explained below, its primary purpose is to assist in initiating the operation of the invention.

At a lower portion of primary reservoir 30 is an opening where the primary reservoir is attached to liquid tower 36. The opening allows liquid from primary reservoir 30 to pass into the liquid tower 36.

At a lower portion of liquid tower 36, means are provided for generating electricity from the potential energy stored in the column of liquid in liquid tower 36 and primary reservoir 30. The means for generating electricity can be a turbine, paddlewheel or any other suitable device operatively coupled with an electric generator. In the embodiment shown in FIG. 4, a turbine 38 and generator 40 are used for the purpose of generating electricity from the column of liquid. Liquid exiting turbine 38 is collected in collector reservoir 42. Collector reservoir 42 is provided with a servo-valve 44 for controlling the flow of water between collector reservoir 42 and boiler 10.

Servo-valves 26 and 44 are preferably proportional valves. Once the device reaches steady state conditions, the position of these valves will remain essentially fixed. Nevertheless, the proportional valves are preferred for the purpose of precisely regulating the operation of the device when it is initiated and under steady state conditions.

As shown in FIG. 4, a regulator 46, which may be a computer, is provided for controlling the operation of servo-valves 26, 32 and 44. Regulator 46 also controls the operation of compressor 24 and fan 14. Pressure sensors 48 and 50 mounted respectively within the condenser 18 and boiler 10 provide information to the regulator 46 for the purpose of controlling the vacuum pump 34, servo-valves 26, 32, 44, fan 14 and compressor 24. An outside air temperature sensor 52, a flow meter 54 located below servo-valve 26 and a flow meter 56 located below servo-valve 44 also provide information to the regulator 46 for the purpose of controlling the apparatus. The compressor 24, fan 14 and vacuum pump 34 are both driven by electric motors powered by generator 40.

To initially prepare the device for operation, the boiler 10 is filled with liquid up to level 58 and collector reservoir 42 is filled with liquid up to level 60. Liquid tower 36 and primary reservoir 30 are filled with water up to level 62. Servo-valves 32 and 44 are closed and servo-valve 26 is held open. Prior to the start of operation, the liquid contained in reservoir 30, reservoir 42 and boiler 10 are at a temperature $T_0$, which is substantially equal to the temperature of the air outside of the device. Vapor trap 28 contains no liquid at this point.

To begin operation, the vacuum pump 34 is started and servo-valve 32 is opened. The pressure within the boiler 10, vapor tower 16, condenser 18, vapor trap 28 and primary reservoir 30 is caused to decrease by operation of vacuum pump 34. The pressure is continually lowered until it is equal to the $P_0$, pressure necessary to boil the liquid contained within the boiler 10 at approximately $T_0-1°$ C. At this point, liquid in the boiler 10 and tank 30 will vaporize. Vapor generated in boiler 10 mixed with air contained in the apparatus will be drawn up through the vapor tower 16, evaporator 18, vapor trap 28 and tank 30, and will be evacuated to the outside atmosphere. Vacuum pump 34 will continue to operate until substantially all of the air has been removed from the apparatus.

Once pressure sensor 50 indicates that the necessary decrease in pressure within the device has been achieved, regulator 46 causes compressor 24 to begin operating. As a result, compressor 24, in combination with condenser 22, will begin transferring heat out of evaporator 20. Eventually, the temperature at evaporator 20 will be caused to drop below the boiling point of the liquid in the device, causing the vapor in condenser 18 to condense into liquid. Once this occurs, servo-valve 44 can be opened to allow liquid to pass into the collector reservoir. Once flow meters 54 and 56 indicate that the flow of liquid passing through vapor trap 28 is equal to the flow of liquid through turbine 38, servo-valve 32 is closed and vacuum pump 34 can be turned off.

The foregoing is a description of a preferred method for initiating the operation of the apparatus. It should be noted, however, that the apparatus is not so limited. Any suitable initiation procedure can be used if the end result is steady state operating conditions as described below.

During initiation of the apparatus and after steady state conditions have been achieved, regulation of flow and pressure differentials can be achieved through the use of compressor 24, fan 14 and servo-valves 26 and 44 in following manner. If pressure sensor 50 indicates that the pressure inside boiler 10 becomes smaller than $P_0$, then less power is applied to compressor 24. This will cause less vapor to condense in condenser 18 and cause the pressure inside the apparatus to increase. Alternatively, if pressure sensor 50 indicates that the pressure inside boiler 10 becomes greater than $P_0$, then more power will be applied to compressor 24. This will cause more vapor to condense in condenser 18 and will cause the pressure to decease.

Fan 14 regulates the rate at which vapor is generated by boiler 10. If flow sensor 54 indicates an insufficient flow of condensed vapor, the speed of fan 14 is increased. Increasing the speed of fan 14 in this manner will increase the amount of heat delivered to boiler 10 from the outside air and will therefore increase vapor production. If flow sensor 54 indicates that too much liquid is being condensed from the vapor, the speed of fan 14 can be decreased.

To further regulate the operations of the apparatus, flow sensor 56 is provided to determine the amount of liquid passing through turbine 38. In response to information provided by flow sensor 56, regulator 46 will adjust the size of the opening of servo-valve 44. By increasing or decreasing the size of the opening, the flow of liquid into boiler 10 can be adjusted as necessary. Finally, flow sensor 54 is provided to determine the amount of liquid passing through vapor trap 28. In response to information provided by flow sensor 54, regulator 46 will adjust the size of the opening of servo-valve 26. If regulator 46 determines that the flow of liquid through vapor trap 28 is excessive, servo-valve 26 can be adjusted to decrease the size of the opening between the condenser 18 and vapor trap 28. Decreasing the opening of servo-valve 26 will result in liquid in condenser 18 at least partially covering the surface area of evaporator 20. This will result in a decrease in the surface area of evaporator 20 exposed to the vapor in condenser 18 and will, consequently, result in decreased condensation occurring within the condenser 18.

In FIG. 4, when the apparatus reaches a stable operating condition, the mass of vapor going up through vapor tower 16 will be equal to the mass of liquid going through the vapor trap 28, and equal to the mass of liquid going through servo-valve 44. Under these conditions, the pressure in the condenser 18 and the primary reservoir 30 will remain essentially constant. Furthermore, the temperature of the liquid in liquid tower 36 will be essentially equal to the temperature of the condensation in condenser 18. Under these circumstances, the device will generate energy.

It should be noted that, when the apparatus of FIG. 4 is first initiated, generator 40 will not be generating sufficient energy to operate vacuum pump 34, regulator 52, compressor 24, fan 14 and the various other electrical components associated with the device. Thus, an outside source must be provided for generating electricity to run these various components until the apparatus reaches steady state operating conditions. This can be achieved in several different ways. One possibility would be to provide a diesel engine to turn generator 40 during an initial start-up period for the sole purpose of generating electricity. A clutch mechanism could be used to disconnect generator 40 from turbine 38 during this initial start-up period. After the device has reached steady state operating conditions, the diesel generator is disengaged from generator 40 and the clutch mechanism allows generator 40 to be reconnected to turbine 38. Alternatively, the apparatus may be operated by means of an external source of electricity during initial start up conditions and a switching system may be provided to disconnect said external source of electricity once a steady state conditions have been reached. Any other suitable means for providing electric energy to the apparatus during initiation can also be used in the present invention.

Figure 5:
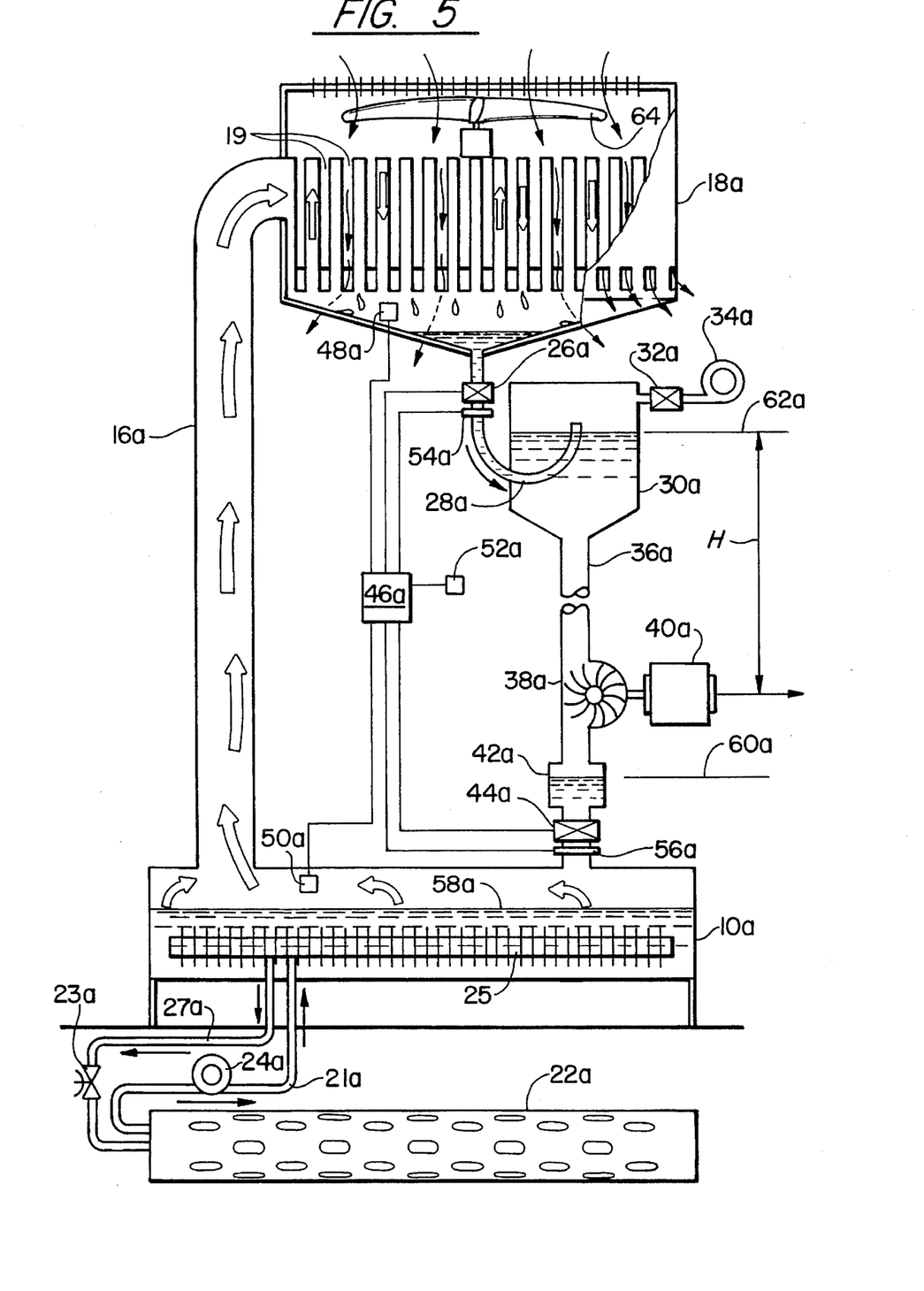
FIG. 5 shows a schematic diagram of a second embodiment of the present invention which is designed for conditions wherein the sea or subterranean water supply is warmer than the air surrounding the device.

The embodiment of the invention disclosed in FIG. 4 will produce energy when the temperature of the air is greater than the temperature of the sea or subterranean water source. In FIG. 4, the outside air served as a heat source, and the subterranean water supply or ocean served as a cold source. FIG. 5 shows a second embodiment according to the present invention configured to operate under the opposite conditions, i.e., wherein the air is colder than the sea or subterranean source of water.

The apparatus in FIG. 5 is generally similar to the apparatus in FIG. 4. Accordingly, the various components in FIG. 5 which are analogous to those previously recited in FIG. 4, will be identified using the same reference numerals as in FIG. 4 with the suffix "a".

In the invention according to FIG. 5, heat exchanger 22a collects heat from a subterranean water supply or from the sea, and transfers said heat to boiler 10a by means of heat exchanger 25. Ducts 21a, 27a, expansion valve 23a, heat exchanger 22a, compressor 24a and evaporator 20a function as a heat pump in a manner roughly similar to that previously described with respect to the heat pump in FIG. 4. Significantly, however, in FIG. 5, heat is transferred to heat exchanger 25 and away from heat exchanger 22a. The heat thus applied to boiler 10a is used to generate vapor. Vapor generated in boiler 10a rises upwardly through vapor tower 16a and will collect in condenser 18a.

In FIG. 5, a fan 64 is provided in association with condenser 18a for the purpose of creating a flow of air through air ducts 19 in condenser 18a. The flow of air, in this case, serves as a cold source for the condenser 18a and allows the vapor collected inside condenser 18a to be condensed into liquid form. Liquid condensed in condenser 18a passes down through the bottom of the condenser and exits through an opening controlled by servo-valve 26a. In FIG. 5, condenser 18a is shown as a simple heat exchanging device with heat dissipating air ducts 19 passing through its interior. Significantly, however, the invention is not so limited. Condenser 18a may be formed from any suitable mechanism capable of collecting vapor and condensing said vapor into liquid form by using the outside air as a cold source. Numerous devices for achieving this result are possible and it is not intended that the invention be limited to any specific condenser type.

The embodiment disclosed in FIG. 5 is initiated and operates in a manner similar to the apparatus in FIG. 4, except that the heat source is now selected from the subterranean water supply or the sea, and the cold source is the air surrounding the device. As with the previous embodiment, the pressure inside the apparatus is preferably maintained such that the boiling point of the liquid will be equal to approximately $T_0+1°$ C.; $T_0$ being the temperature of the outside air. One important difference relating to the operation of the device according to FIG. 5 concerns the means for maintaining the proper pressure and flow rates within the device. In FIG. 5, compressor 24a will regulate the rate at which vapor is produced in the device. If flow sensor 54a indicates too small a flow of liquid, more power is applied to compressor 24a. This will result in an increase in the amount of heat transferred to boiler 10a from the sea or subterranean water supply (heat source) and will therefore increase vapor production. Conversely, if flow sensor 54a indicates too large a flow of liquid, the power applied to compressor 24a is decreased. Pressure in the device is regulated by fan 64. If pressure sensor 50a indicates that the pressure inside boiler 10a becomes smaller than $P_0$, the speed of fan 64 is decreased. This will result in less vapor being condensed and will therefore cause the pressure to increase. Alternatively, if pressure sensor 50a indicates that the pressure inside boiler 10a becomes greater than $P_0$, then the speed of fan 64 is increased. This will increase condensation of vapor and lower the pressure. In all other respects, the embodiment of the invention shown in FIG. 5 operates in the same manner as described with respect to FIG. 4.

Figure 6:
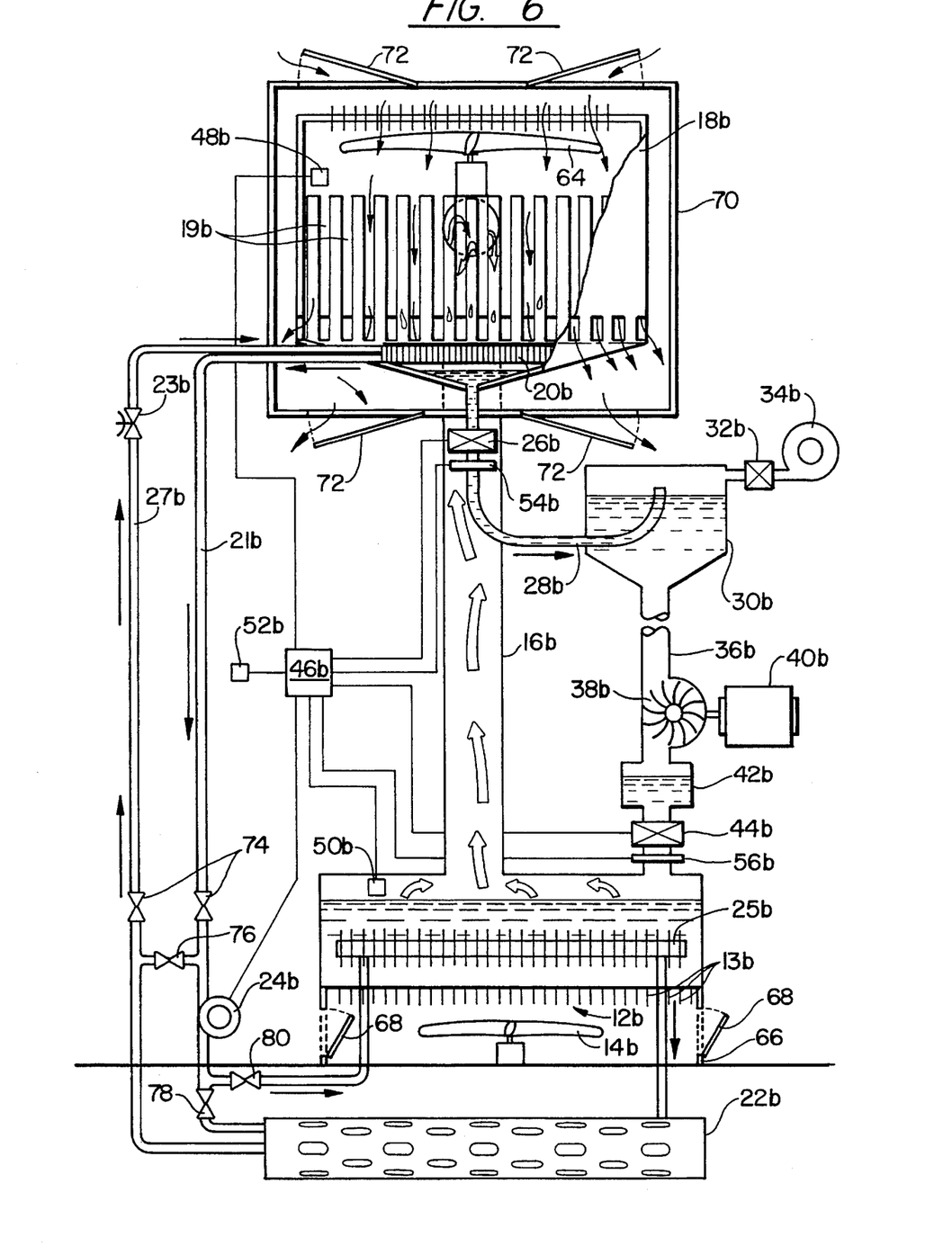
FIG. 6 shows a schematic diagram of a third embodiment of the present invention which is designed for conditions wherein the temperature of the air may fluctuate above and below the temperature of the sea or subterranean water supply.

In many areas of the world, the temperature of the atmosphere will naturally vary above and below the temperature of the sea and/or subterranean water supply. FIG. 6 shows a third embodiment according to the present invention, wherein a valve and gate system is provided to allow the apparatus to function in the manner described with respect to FIG. 4 or FIG. 5. Analogous components in FIG. 6, which operate in the same manner as previously described with respect to FIGS. 4 and 5, are identified with the same reference numbers as in FIGS. 4 and 5 with the suffix "b".

As shown in FIG. 6, heat exchanger 12b is enclosed in a substantially airtight chamber 66. Two or more gates 68 are provided which, when opened, allow air to be moved by fan 14b from the outside environment to the heat exchanger 12b. Condenser 18b is similarly enclosed in a second substantially airtight chamber 70 which is provided with two or more gates 72 which, when opened, allow air to be moved by fan 64b from the outside environment and through the condenser 18b. Thus, depending upon conditions, the air surrounding the apparatus may be used as either a heat source for boiler 10b or a cold source for condenser 18b.

Further according to FIG. 6, the apparatus includes a heat exchanger 22b capable of transferring heat to or from a subterranean water supply or to the sea. The heat may be transferred to heat exchanger 25b, or from evaporator 20b. Heat exchanger 22b and 20b or heat exchangers 22b and 25b, in conjunction with compressor 24b will operate as a heat pump, depending upon the positions of valves 74, 76, 78 and 80.

In order for the apparatus to function in the manner recited with regard to FIG. 4, it must be configured such that gates 68 are open, gates 72 are closed, valves 74 are open, valve 76 is closed, valve 78 is open and valve 80 is closed. Alternatively, the device will function in the manner disclosed with regard to FIG. 5 when it is configured such that gates 68 are closed, gates 72 are open, valves 74 are closed, valve 76 is open, valve 78 is closed and valve 80 is open.

Figure 7:
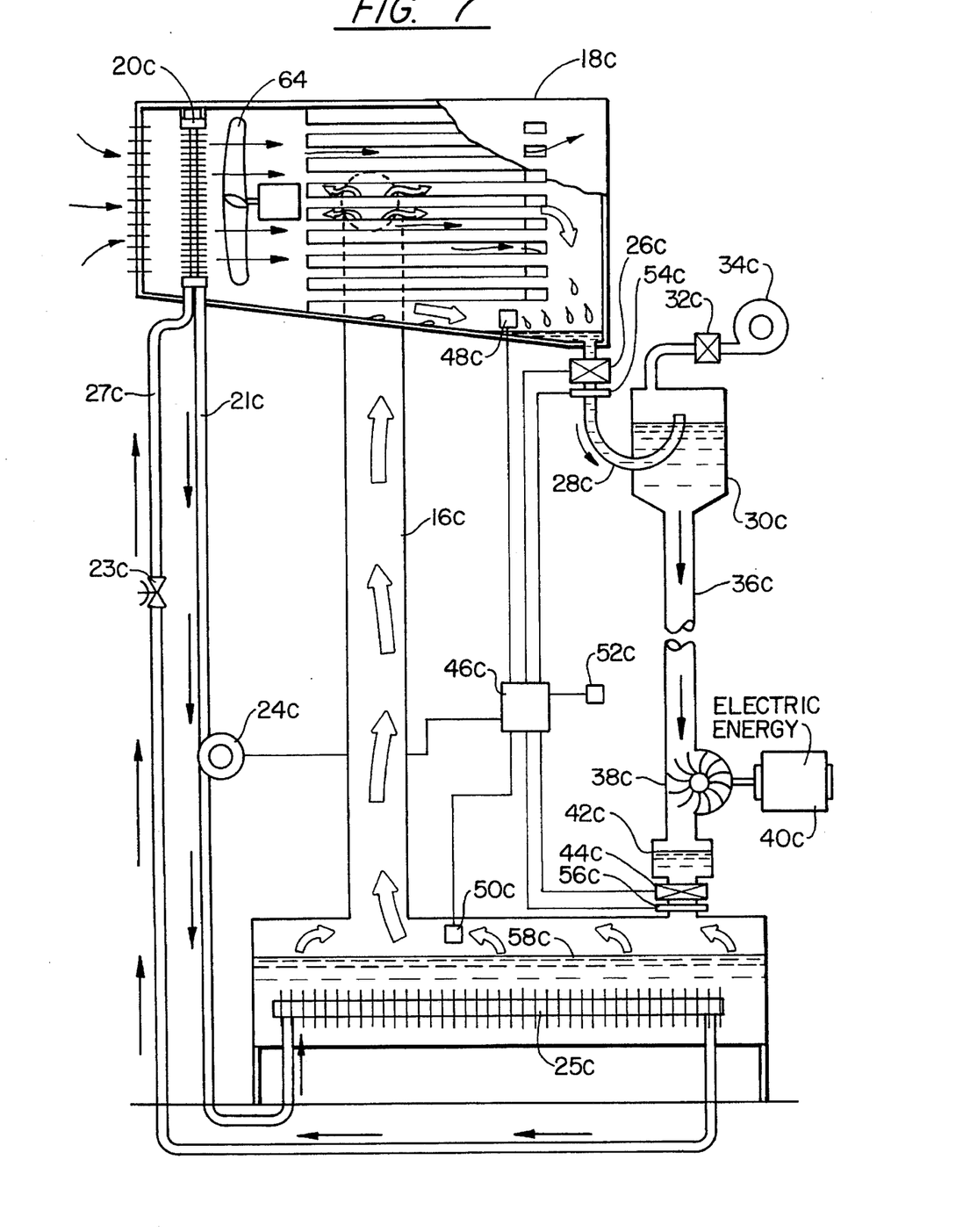
FIG. 7 is a schematic diagram of a fourth embodiment of the device according to the present invention capable of operating in conditions where a naturally occurring temperature differential is not available.

Once the apparatus shown in FIGS. 5, 6 and/or 7 have become fully stabilized in the manner previously described, their operation can be analyzed as discussed below. For the purpose of this analysis, it will be assumed that the liquid contained in the system is water, and that the apparatus is operating under standard conditions, i.e. 15° C., and 100,015 N/m². The subterranean water supply or sea will be assumed to be at a temperature of 5° C. For the purpose of analysis, the cross-section of vapor tower 16 will be defined as C and its height as L.

If the density, $\rho_1$ is the density of steam inside the vapor tower 16 at temperature $T_1$ and $P_1$, then the total mass of steam in the vapor tower 16 can be expressed as $\rho_1 CL$. Based upon the foregoing, it can be shown from equation 5 that $\Sigma_w$ for the steam in the vapor tower 16 is $$(P_0-P_1)CL - \rho_1 CL^2 g = CL[(P_0-P_1) - \rho_1 Lg] \tag{9}$$

In equation 9, g is a constant, $P_0$ is the pressure at the bottom of vapor tower 16, and $P_1$ is the pressure at the top of vapor tower 16. The value of $P_0$ is determined by calculating the boiling pressure of water at the following temperatures with respect to FIGS. 4 and 5:

FIG. 4: $T_{11} - \Delta T \leq T_1 \leq T_{11} - 1°$ C.
($T_1$ is the temperature at bottom of vapor tower 16; $T_{11}$ is the temperature of the air outside the apparatus)

FIG. 5: $T_0 + 1°$ C. $\geq T'_1 \geq T_0 + \Delta T$
($T'_1$ is the temperature at the top of vapor tower 16; $T_{11}$ is the temperature of the air outside the apparatus)

If $T_2$ is defined as the temperature inside the condenser, then the pressure inside the condenser must be:

$$P_1 = (P_0 - \rho_1 GL)\sqrt{T_2/T_1} \tag{10}$$

Substituting equation 10 into equation 9, we have:

$$\Sigma_w = [(P_0/\rho_1) - (P_0/\rho_1 - Lg)\sqrt{T_2/T_1}) - Lg] \text{ (per unit mass)} \tag{11}$$

$$= [(1 - \sqrt{T_2/T_1})(P_0/\rho_1 - Lg)] \text{ (per unit mass)}$$

In the above equation, since $T_2$ will necessarily be less than $T'_1$, then $T_2/T'_1$ is also less than 1 and $\sqrt{T_2/T'_1}$ will be less than 1. Thus, it can be seen that $1 - \sqrt{T_2/T'_1} > 0$. Likewise, since $P_0$ is approximately $10^3$ N/m² and $\rho_1 Lg$ is approximately $10^2$ N/m³, then it can also be seen that $(P_0 - \rho_1 Lg)$ will be greater than zero. Accordingly, $\Sigma_w$ must be greater than zero.

It is significant to note that the heat introduced in boiler 10 to vaporize the liquid contained therein is later extracted from the steam in condenser 18. Thus, the total heat of the water in the boiler 10 will be the same as the total heat of the water in primary reservoir 30. Likewise, it is significant to note that the kinetic energy of the water molecules in the boiler 10 and the kinetic energy of the water molecules in the reservoir 30 are essentially null. Thus, there is no increase in kinetic energy for the water between level 40 and level 44. As a result, it can be seen that the total energy for the water going from boiler 10 to reservoir 30 must result in an increase in potential energy.

From equation 11, it is known that the increase in total energy for all of the steam in the vapor tower 16 (per unit mass) is $$E_{IT} = [(1 - \sqrt{T_2/T_1})(P_0/\rho_1 - Lg)].$$

The increase in potential energy for the steam in the vapor tower 16 is $$E_{IP} = \rho_1 gL.$$

Thus, if $$\rho_1 g L > [(1 - \sqrt{T_2/T_1}) \ (P_0/\rho_1 - Lg)]$$

then there will not be sufficient energy supplied to the steam to reach the condenser 18, and the steam will condense before reaching that altitude. By comparison, if $$\rho_1 g L < [(1 - \sqrt{T_2/T_1}) \ (P_0/\rho_1 - Lg)],$$

then too much heat is being supplied to the liquid in the boiler 10, or not enough heat is being extracted from the steam in the condenser 18. As a result, steam pressure in the vapor tower 16 will be caused to increase. In view of the foregoing, it can be seen that the apparatus is operating most effectively when $$\rho_1 g L = [(1 - \sqrt{T_2/T_1}) \ (P_0/\rho_1 - Lg)]. \quad (12)$$

As the steam within vapor tower 16 rises, its pressure will decrease from $P_0$ to $P_0 - \rho_1 g L$. This decrease in pressure is an adiabatic decompression. Thus, the temperature of the steam in the vapor tower 16 will be caused to decrease in the amount $$\rho_1 g L = C_v \rho_1 (T_1 - T'_1)$$

From this it can be shown that $$T'_1 = C_v \rho_1 T_1 - \rho_1 g L)/(C_v \rho_1) \quad (13).$$

Based upon equation 13, it can be seen that the water in primary reservoir 30, liquid tower 36 and collector reservoir 42 will be cooler than the boiling point $T_1$. Thus, once the water has been discharged into boiler 10, it will be necessary to apply additional heat to raise its temperature back to $T_1$. This quantity of heat will be $C_v P_1 (T_1 - T'_1)$. Thus, it can be seen that the total quantity of heat added in the boiler 10 to the liquid will be $$C_v \rho_1 (T_1 - T'_1) + C_p \rho_1 \quad (14)$$

wherein $C_v \rho_1 (T_1 - T'_1)$ is the increase in potential energy, and $C_p \rho_1$ is the heat which must be added to boil the water.

Analysis of the Apparatus According to FIG. 4.

In the device according to FIG. 4, the temperature $T_{11}$ of the heat source, i.e. the atmosphere surrounding the apparatus, is an uncontrolled variable, subject to change. To ensure proper heat transfer from the outside air to boiler 10, the temperature $T_1$ in the boiler 10 must be lower than the temperature $T_{11}$ of the outside air. Assuming that $T_1$, the temperature inside boiler 10, is equal to $T_{11} - 5°$ C., it is possible to determine $P_0$, the pressure necessary for the water to boil at that temperature. It is then possible to calculate $T_2$ and $T_1'$ utilizing equations 12 and 13. Based on $T_1'$ and $T_{10}$ (the temperature of the subterranean water supply or the sea), it is then possible to calculate the efficiency of the condenser system in FIG. 4 comprising heat pump 24, evaporator 20, condenser 22 and condenser 18.

The quantity of heat necessary to condense the steam will, at most, be $Q_{EC} = C_{p1} \rho_1$. If $T'_1 < T_{10}$, then the efficiency of the condenser system $\eta$ can be represented as $$\eta_0 = T_{10}/(T_{10} - T'_1) \quad (15)$$

alternatively, if $T'_1 > T_{10}$, then the efficiency of the condenser system is $$\eta_1 = T'_1/(T'_1 - T_{10}). \quad (16)$$

If $E_f$ is the efficiency of the compressor 24, then the quantity of electric energy which must be provided by the electric generator 40 to operate compressor 24 will be:

$$[(C_{p1} \rho_1)/\eta_1] \times E_f (\text{for } T'_1 > T_{10}) \quad (17)$$

or, $$[(C_{p1} \rho_1)/\eta_0] \times E_f (\text{for } T'_1 < T_{10}) \quad (18).$$

If $E_E$ is the efficiency of the combination of turbine 38 and generator 40, then the quantity of electric energy $Q_A$ available from the apparatus will be $$\begin{aligned} Q_A &= \rho_1 g L E_E - [(C_{p1} \rho_1 / \eta_1] \ E_f (\text{for } T_1 > T_{10}) \quad (19) \\ &= \rho_1 [g L E_E - (C_{p1}/\eta_1) \ E_f] \end{aligned}$$

or, $$\begin{aligned} Q'_A &= \rho_1 g L E_E - [(C_{p1} \rho_1)/\eta_0] \ E_f (\text{for } T_1 < T_{10}) \quad (20) \\ &= \rho_1 [(g L E_E - (C_{p1}/\eta_0) \ E_f] \end{aligned}$$

As an example, consider the case where the liquid in the system is water and $T_1 = 100°$ C.
$C_p \sim 2,000$ J/kg (Nm/kg)
$\eta_0 \sim 10$,
$E_E \sim 0.8$, and
$E_f \sim 0.9$.

Substituting these values into equation 19, we have $$Q_A = \rho_1 [(10L \times 0.8 - (2000/10) \times 0.9)] = \rho_1 (8L - 180) \quad (21)$$

It can be seen in equation 20 that if L is greater than 180/8 meters, then $Q_A$ will be greater than zero. Thus, in this example, if the vapor tower 16 in FIG. 4 is higher than 22.5 meters, the apparatus will generate energy.

The above analysis was performed for the device according to FIG. 4. A similar analysis can be performed with respect to FIG. 5 as demonstrated below.

Analysis of the Embodiment According to FIG. 5

In FIG. 5, condenser 18 will rely on the air surrounding the device as a cold source. Thus, the device must be configured such that the steam or vapor will condense at a temperature $T_2$ equal to that of the outside air $T_{11}$. Once $T_2$ has been determined, it is possible to determine $P_0$ and $T_1$ and $\rho_1$.

Once $T_2$ and $T_{10}$ ( the temperature of the subterranean water supply or the sea) are known, it is possible to calculate the efficiency of the system including fan 64, pump 24a and condenser 22a, which will be necessary to produce heat in the boiler 10a. The total quantity of heat $Q_{EC}$ which must be added to the liquid in boiler 10 (see equation 14) will be $$Q_{EC} = C_{p1} \rho_1 + C_v \rho_1 (T_1 - T_2),$$

or $$C_{p1} \rho_1 + \rho_1 g L \quad (22)$$

If $T_{10} < T_2$, then the efficiency can be calculated as $$\eta_0 = T_2/(T_2 - T_{10}).$$

Alternatively, if $T_{10} > T_2$, then the system will have an efficiency of $$\eta_0 = T_{10}/(T_{10} - T_2).$$

Assuming, once again, that $T_1 = 100°$ C.

$C_{p1} \sim 2{,}000$ J/kg $\eta_0 \sim 10$, $E_E \sim 0.8$ and $E_f \sim 0.9$,

From equations (14) and (23), the quantity of excess electricity available will then be $$Q_A = \rho_1 g L \times E_E - [(C_{p1}\rho_1 + \rho_1 g L)/\eta_0] \times E_f \; Q_A = \rho_1[10L \times 0.8 - [(2000+10L)/10] \times 0.9] = \rho_1(7.1L - 180)$$

In the above equation, if $L > 180/7.1$, then $Q_A$ will be greater than zero. Thus, if the vapor tower $16b$, is higher than 23.5 meters, power will be available from the apparatus.

In the above analysis, it can be seen that a quantity of heat $Q_1$ is applied to the water in the boiler $10a$, and a quantity of heat $Q_2$ is extracted from the steam by the outside air, wherein $Q_1$=quantity of heat to vaporize the water plus the increase in potential energy; and $Q_2$=quantity of heat removed from the steam in order to cause it to condense.

Based upon the foregoing, it can be said that $Q_2-Q_1$ is the increase in the potential energy of the vapor as it moves from the bottom of the vapor tower $16a$ to the top of the vapor tower $16a$. The above equations demonstrate that this increase in potential energy is obtained by making use of the temperature differential between the atmosphere and underground water supply.

FIG. 7 discloses a fourth embodiment according to the present invention, using similar components as above, but associated in a slightly different manner. In FIG. 7, components which are analogous to those in FIG. 4 are represented by the same reference numbers, but with the suffix "c".

In FIG. 7, a heat pump evaporator $20c$ extracts a quantity of heat $Q_1$ from air at temperature $T_0$. This quantity of heat is transferred to a liquid in boiler 10 by means of heat pump condenser 82. If the outside air is at temperature $T_0$, then after passing through heat pump evaporator $20c$, it is at a temperature $T_1$, wherein $T_1 < T_0$. This same volume of air is then passed through condenser $18c$ where it absorbs a quantity of heat $Q_2$, wherein $Q_2$ equals the heat necessary to condense vapor into liquid in condenser $18c$.

The apparatus shown in FIG. 7 operates in essentially the same manner as those shown in FIGS. 4, 5 and 6. Thus, the same equations derived in connection with the embodiments disclosed in FIGS. 4 and 5 also apply to the apparatus of FIG. 7. The primary difference between the embodiment of FIG. 7 and those in FIGS. 4 and 5 is the manner of obtaining hot and cold sources. In FIG. 7, the air before passing through evaporator 36 serves as a hot source, and after passing through evaporator 36 serves as a cold source in order to condense vapor. When configured in the manner of FIG. 7, the device according to the present invention offers the advantage of being able to operate in locations where there is no naturally-occurring temperature differential between a hot and cold source.

It will be appreciated that numerous embodiments and modifications of the above invention may be devised by those skilled in the art, and it is intended that the appended claims cover all such modifications and embodiments as fall within the true spirit and scope of the present invention.

I claim:

1. A method of generating energy with an apparatus, said method comprising the steps of:

(a) heating a fluid, contained in a vessel in a liquid state, by heat exchange with a heat source to generate a vapor of said fluid at a first elevation;

(b) causing the vapor of the fluid to rise to a second elevation within an enclosed space;

(c) condensing the vapor of the fluid at said second elevation by h at exchange with a cold source;

(d) causing the condensed fluid to fall from said second elevation;

(e) converting the energy of the falling fluid to another form of energy (f) returning the fallen fluid to the vessel; and wherein steps (a), (b) and (c) occur at a pressure wherein said fluid vaporizes at a temperature substantially equal to the temperature of the exterior environment;

and a regulator controls the rate of heating, condensing and energy conversion, said regulator receiving inputs from temperature, pressure and fluid flow sensors positioned within the apparatus and at least one temperature sensor outside the apparatus and, based on input data provided by said sensors, regulates the rate of heating, condensing and energy conversion.

2. An apparatus for generating energy, said apparatus comprising:

vaporizing means for applying a vaporization energy to a liquid to form a vapor from said liquid, said vaporization energy being provided by a naturally-occurring heat source;

vapor tower means for increasing the potential energy of said vapor by causing said vapor to rise along an upwardly-extending path under a pressure differential;

means for condensing said vapor by heat exchange with a naturally-occurring cold source;

means for recovering said increase in potential energy from said vapor, and converting said energy increase into electric power;

pressure, temperature and flow sensors positioned inside the apparatus, and at least one temperature sensor positioned outside the apparatus;

regulator means for controlling the rate of vapor production in said vaporizing means, the rate of vapor condensation in said means for condensing, and the rate of potential energy conversion into electric power in said means for recovering said increase in potential energy, said regulator means receiving input data from said temperature, pressure and flow sensors.

wherein said vaporizing means, said vapor tower means and said means for condensing maintain the vapor at a pressure sufficient to allow said liquid to vaporize at a temperature substantially equal to an environmental temperature outside the apparatus.

3. The apparatus of claim 2, wherein said heat source is atmospheric air and said cold source is selected from at least one of a group consisting of subterranean water source and seawater.

4. The apparatus of claim 3, wherein said liquid is contained in a boiler, the vaporizing means being comprised of atmospheric air forced over a boiler heat exchanger for transferring heat to said boiler.

5. The apparatus of claim 3, wherein the vaporizing means is comprised of at least one heat transfer conduit passing through a boiler containing said liquid, said conduit containing atmospheric air forced through said conduit by at least one fan.

6. The apparatus according to claim 3, wherein said means for condensing vapor comprises a heat pump system.

7. The apparatus according to claim 6, wherein said heat pump system includes:

a heat exchanger immersed in at least one of the group consisting of said seawater and said subterranean water source;

an evaporator;

and heat transfer means for transferring heat from said evaporator to said heat exchanger.

8. The apparatus according to claim 7, wherein said heat transfer means includes a first conduit for permitting refrigerant to pass from said heat exchanger to said evaporator, an expansion valve placed between said first conduit and said evaporator, a second conduit for passing refrigerant from said evaporator to said heat exchanger and a compressor for compressing said refrigerant as it passes from said evaporator to said heat exchanger.

9. The apparatus according to claim 2, wherein said vapor tower means is comprised of an upwardly extending chamber attached at a lower end to a boiler in a gas tight manner and attached at an upper end to a condenser in a gas-tight manner.

10. The apparatus according to claim 2, wherein said means for recovering said increase in energy from said vapor and converting said energy increase into electric power is comprised of:

a primary reservoir for receiving condensed liquid from said means for condensing said vapor;

a liquid tower attached in a liquid-tight manner to an opening in a lower portion of said primary reservoir, said liquid tower extending downwardly from said primary reservoir;

turbine means mounted at a lower end of said liquid tower for receiving liquid exiting said liquid tower;

a generator operatively associated with said turbine means, said generator being caused to produce energy when said liquid passes through said turbine means; and a collector reservoir for receiving said liquid after said liquid has passed through said turbine means.

11. The apparatus according to claim 10, wherein conduit means are provided to permit said liquid to flow from said collector reservoir to said vaporizing means, a servo-valve being provided for controlling said flow.

12. The apparatus according to claim 10, further comprising a vacuum pump connected to an upper portion of said primary reservoir through a servo-valve, said vacuum pump provided for removing air from the apparatus upon initiation.

13. The apparatus according to claim 2, wherein vapor pressure in the vaporizing means and condensing means is controlled by said regulator means by varying the rate of heating and condensing.

14. The apparatus according to claim 2, wherein said heat source is selected from at least one of a group consisting of a subterranean ground water source and the sea, and said cold source is atmospheric air surrounding the apparatus.

15. The apparatus according to claim 14, further comprising a heat pump, wherein heat from said heat source is applied to said liquid by means of said heat pump.

16. The apparatus according to claim 14, further comprising air ducts passing through the interior of said means for condensing said vapor, and wherein said cold source is used to condense said vapor by forcing atmospheric air through said air ducts for receiving heat from said vapor contained within said means for condensing.

17. The apparatus according to claim 2 wherein said heat source and said cold source can each be selected from a group consisting of atmospheric air, seawater and a subterranean water source whereby a naturally occurring temperature differential may be realized.

18. The apparatus according to claim 17, wherein a flow of atmospheric air and a flow of a refrigerant associated with a heat pump may be selectively controlled depending on the temperature of the atmospheric air relative to at least one of said subterranean water source and said seawater.

19. The apparatus according to claim 18, further comprising refrigerant valves, wherein said flow of refrigerant is selectively controlled by said refrigerant valves so it may be used to condense said vapor in said means for condensing, and the flow of atmospheric air is selectively gated to said vaporizing means for vaporizing said liquid.

20. The apparatus according to claim 18, further comprising refrigerant valves, wherein said flow of refrigerant is selectively controlled by said refrigerant valves so said flow can be used to vaporize said liquid in said vaporizing means, and the flow of atmospheric air is selectively gated to said means for condensing said vapor for absorbing heat from said vapor.

21. The method according to claim 1, wherein said heating comprises exchanging heat with atmospheric air; and said condensing comprising exchanging heat with at least one member of a group consisting of a subterranean water source and seawater.

22. The method according to claim 21, wherein said heating comprises forcing the atmospheric air into a heat exchanger which is in contact with the fluid to thereby transfer heat from the atmospheric air to the fluid.

23. The method according to claim 1, wherein said condensing comprises exchanging heat with said cold source by operating a heat pump.

24. The method according to claim 1, wherein said controlling rates of heating, condensing and energy conversion comprises sensing pressure within the apparatus.

25. The method according to claim 1, further comprising controlling vapor pressure by adjusting a rate of heating and condensing.

26. The method according to claim 1, wherein said heating comprises exchanging heat with at least one member of a group consisting of a subterranean water source and seawater; and said condensing comprising exchanging heat with atmospheric air.

27. The method according to claim 26, wherein said heating comprises operating the heat pump to transfer heat from the heat source to the fluid.

28. The method according to claim 1, wherein said heating comprises exchanging heat with a first member of a group consisting of atmospheric air, a subterranean water source and sea water; and said condensing comprises exchanging heat with a second member of the group consisting of atmospheric air, a subterranean water source and sea water, wherein said first member is not the same as said second member.

29. The method according to claim 28, wherein said heating comprises regulating flow of atmospheric air through a heat exchanger; and said condensing comprises regulating flow of refrigerant in a heat pump.

30. The method according to claim 28, wherein said heating comprises regulating flow of refrigerant in a heat pump; and said condensing comprises regulating flow of atmospheric air through a heat exchanger.

* * * * *